United States Patent Office 3,066,737
Patented Dec. 4, 1962

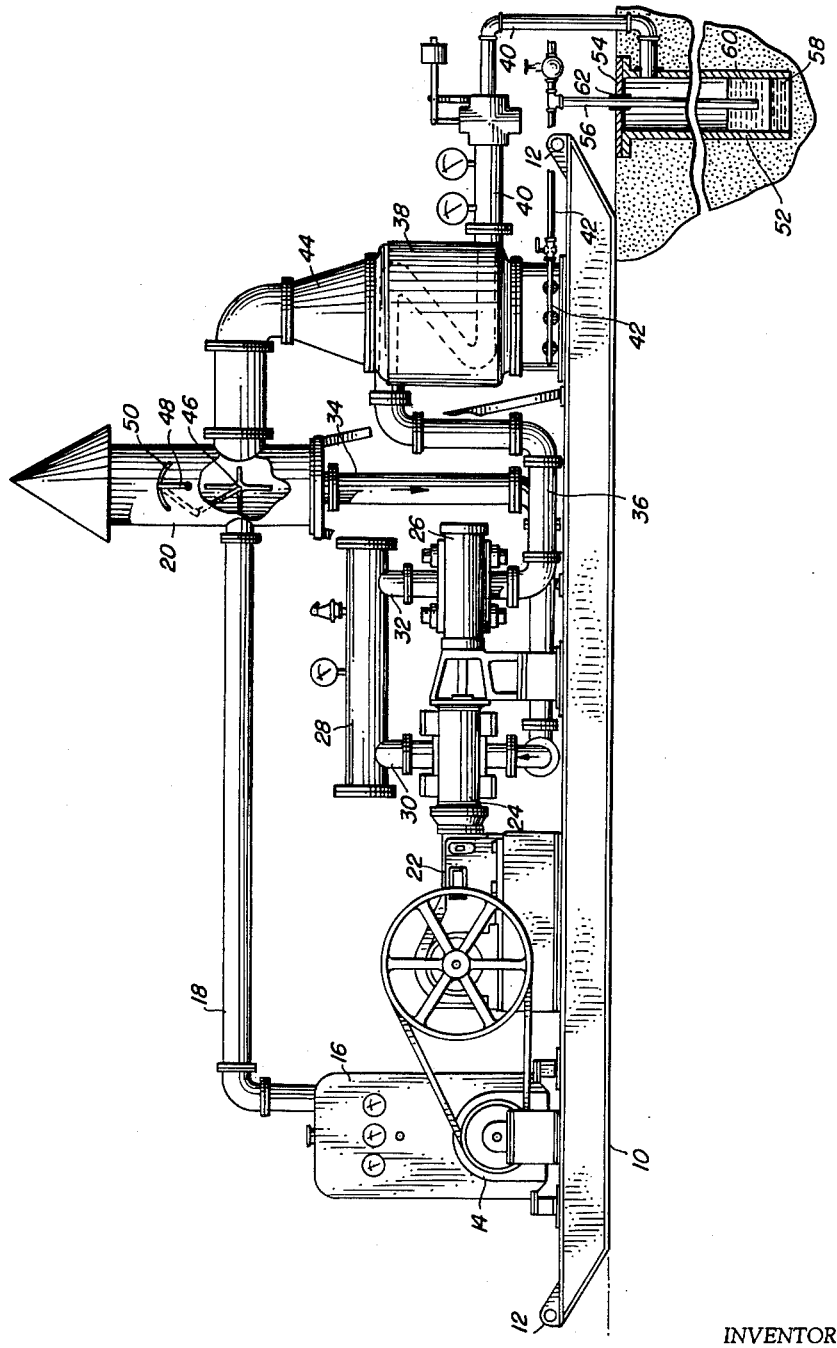

3,066,737
FLUE GAS WELL CASING PRESSURE CYCLING SYSTEM AND APPARATUS
Charles A. Baldwin, Streator, Ill., assignor of one-half to Isaac B. Barrett, Streator, Ill.
Filed Feb. 24, 1959, Ser. No. 795,229
6 Claims. (Cl. 166—57)

This invention relates in general to a flue gas cycling system for recovering fuel oil from relatively shallow wells in sand and other aggregate by introducing oxy-less flue gas applied under heat and pressure to a closed well casing in which crude oil, other liquids and gases have accumulated. The word "oxy-less" derives its meaning from the combining form "oxy" meaning oxygen and "less" implying that it does not support combustion and is therefore flame resistant.

In many accumulations of oil shale, other minerals and particularly oil bearing sands, it is unnecessary to drill deep wells, but a certain amount of oil recovery is possible in relatively shallow casing closed wells five hundred or six hundred feet deep or even more by applying oxy-less flue gas under pressure at the capped top of such a well casing, and in providing a discharge pipe from the bottom of the well through the closed top thereof for discharging and recovering the contents of the well.

For the recovery of oil from such a field, it would be uneconomical to build up a generating unit for each well and a portable unit is provided in which flue gas under pressure is provided for application to one or more of well casings at the same time or to a pattern of such casings through which flue gas under heat and pressure may be applied at the bottom of one well casing which may be centrally located with respect to other well casings so that heating of the oil sands at the lower level of the well casings may induce the flow of oil from the sands to each of the other well casings from which accumulated oil in the casing may be removed by the operation of the generating unit applied specifically thereto.

An important object of the invention is to provide a portable generating unit for flue gas relatively free of oxygen under heat and pressure which may be applied to the top or upper end of a capped oil well casing for discharging and recovering oil from the bottom of the well.

A further object of the invention is to provide a generating unit for a flue gas cycling system, for applying flue gas under pressure at the top of a closed well casing to drive liquid upwardly through an internal pipe extending to or nearly to the bottom of the well.

A further object of the invention is to provide a movable discharge and recovery pipe in a well casing to which fuel gas under pressure is applied adjustable to the level of oil or other liquid to be removed from the well.

Still a further object of the invention is to provide a portable flue gas generating unit in which exhaust from the engine of the generating unit is placed under pressure and is additionally heated before it is applied to the top of a well casing.

A still further object of the invention is to provide a stack for the engine exhaust and for a heat exchanger having a common stack with a controlling damper therein.

Other objects of the invention will appear in the specification and will be more apparent from the accompanying drawings in which the drawing is a side elevation of the principal apparatus together with a somewhat sectional and diagrammatic view illustrating the application of the system for use with a flue gas well casing pressure system.

This apparatus is represented as applied to a single well casing connection and also to heat the flue gas, but other valved connections may be made with the heated flue gas under pressure to apply the oxy-less flue gas to other well casing connections at the same time, providing the generating unit as sufficient capacity for such use. Since this is flue gas, it is flame resistant, does not support combustion and materially reduces if it does not entirely prevent fire hazards.

Referring now more particularly to the drawings, the generating unit is represented as wholly mounted upon a movable barge or scow 10 which may be hollow with upwardly projecting perforated brackets 12 at each end by means of which it may be moved by some suitable power applied at either end.

Mounted upon the scow 10 or other suitable support is a gas engine 14 having an exhaust manifold 16 connected to a discharge pipe 18 for flue gas which extends to an upright stack 20.

The engine is connected to a compressor unit 22 having two compression cylinders 24 and 26 connected to a common header 28 by pipes 30 and 32 respectively. The first compression cylinder 24 is connected to the bottom of the stack 20 by a pipe connection 34 and leading from the second compression stage cylinder 26 is a pipe connection 36 leading through a heat exchange burner 38 and terminating in the flue discharge pipe 40.

At the bottom of the heat exchange burner 38 is a valve control fuel pipe 42 through which fuel is supplied for the burner 38 for heating the flue gas from the pipe connection 36, and at the top of the burner is a flue gas discharge pipe 44 leading also to the fuel gas stack 20. In the stack 20 is a four-way damper 46 controlled by an external arm 48 which moves over a segment 50 to indicate the relative positions of the damper. When turned to one side, it may divert more gases from the discharge pipe 18 and less gases from the gas discharge pipe 44 downwardly but when turned in the other direction, the proportionate amounts may be reversed. When centrally located, approximately equal amounts of the gases may be diverted in both directions from the two discharges.

The fluid discharge pipe 40 is connected to the top of a well casing 52 either through a removable cap 54 therefor or at the side of the pipe as shown, and a discharge pipe 56 preferably extends through the center of the cap 54 and downwardly in the well to or adjacent the bottom thereof and into crude oil 58 which may accumulate in the bottom of the well. Other liquids sometimes accumulate in the well and if the oil is at the top of another liquid such as water 60 in the well, it may be desirable to raise the lower end of the discharge pipe 56 out of the water and into the crude oil level by moving the pipe through a packing gland 62 on the cap 54 of the well casing so that when pressure is applied to the well casing, the oil and not the water will be driven out of the discharge pipe 56 in a well known manner.

The fluid discharge pipe 40 may have several pipe connections leading to different well casings 52 and heated flue gas under pressure may be applied to such wells at the same time or if the wells are located in a suitable pattern, flue gas under pressure may be applied to a central well which will tend to force the heated flue gas through the sand or other material causing the oil therein to accumulate in other wells relating thereto. The generating unit may then be connected to each of the other wells and the oil removed from the bottom thereof as above explained.

In operation, the generating unit may be moved from one location to the other usually that most convenient to the well casing from which oil and gas may be removed, and after the oil or gas has been obtained from one well, the generating unit may be moved or suitably connected to another well, in the same manner.

When the internal combustion or gas engine 14 is started, the manifold 16 is soon filled with exhaust gas which is directed through the discharge pipe 18 to the stack 20. If the damper 46 is turned in one direction, the exhaust will be directed through the top of the stack to the atmosphere. If directed downwardly, into the pipe connection 34, it will pass when the compressor is operated through the first compression cylinder 24, thence through the pipe 30 to the compression header 28 and through the pipe connection 32 to the second compression cylinder 26 and outwardly therefrom through the pipe connection 36 and through the heat exchange burners 38 and outwardly therefrom through the fluid discharge pipe 40, and any branches thereof for useful application. The burner 38 raises the temperature of the compressed flue gas so that it is under heat and pressure when applied to a well casing.

The exhaust fumes from the heat exchange burner 38 pass directly to the stack 20 and when the generating unit is in operating condition, the flue gas obtained from the burner 38 may be approximately at the same heat as that of the engine discharge flue gas and may be of the same or a relatively different amount so that it may be necessary to adjust the damper 46 to obtain the best results and to furnish sufficient flue gas which is substantially free from oxygen to the compressor.

With this generating system, it is therefore possible to treat various oil producing fields to make them economically practical by recovering a suitable amount of crude oil from relatively shallow wells. It is also found practical and economical to treat old fields and old wells in this manner, whether the wells are in a centered or radiating pattern or whether they are individual wells. By making the generating unit portable, it may be moved from one location to another in the same field, or to more distinct fields as desired.

While a preferred construction of this cycling system has been described in some detail, it should be regarded as an illustration or example rather than as a limitation or restriction of the invention, since various changes in the construction, combination, and arrangement of the parts may be made without departing from the spirit and scope of the invention.

I claim:

1. A flue gas well casing pressure system comprising a gas engine having a flue gas exhaust manifold, a compressor operated by the engine to receive and increase the pressure of the exhaust gas, a well casing closed at the top and means for applying the pressurized exhaust gas thereto, and a discharge pipe extending through the casing with its lower end near the bottom for discharging liquid therefrom at the top when the flue gas under pressure is applied to the upper end of the inside of the well casing.

2. A flue gas well casing pressure system in accordance with claim 1, including an exhaust stack and a heat exchange burner which discharges its exhaust into the stack and through which the pressurized exhaust is passed from the compressor to additionally heat it before it is applied to a well casing.

3. An oxy-less flue gas well casing pressure system comprising a gas engine having a flue gas exhaust manifold, an exhaust stack into which the flue gas from the manifold is discharged, a compressor operated by the engine having pipes to receive flue gas from the stack and increase the pressure thereof, a heat exchange burner with pipes through which the flue gas passes from the compressor for heating the flue gas after compression, the burner also having a flue gas discharge pipe into the stack, a well casing closed at the top having means for applying the heated and pressurized flue gas thereto, and a discharge pipe extending into the casing with its lower end near the bottom for discharging liquid therefrom when heated flue gas under pressure is applied to the well casing.

4. A flue gas anti-combustion pressure system in accordance with claim 3, in which the stack has an atmospheric outlet at the top, and damper means in the stack to direct flue gas from the engine and from the heat exchange burner to the outlet and to the compressor.

5. A flue gas well casing system in accordance with claim 4, in which there is a single valve damper means in the stack adjustable to vary the mixture of flue gases from the engine and from the heater which is admitted to the compressor.

6. An oxygen-free flue gas well casing pressure system which does not support combustion comprising a gas engine having a flue gas exhaust manifold, a flue gas mixing stack with pipes for receiving the flue gas from the manifold having a top atmospheric outlet, a two-stage compressor operated by the engine having pipes to receive flue gas from the stack and increase the pressure thereof in separate stages, a heat exchange burner through which the pressurized flue gas is passed from the compressor, a flue gas discharge pipe from the burner into the stack, damper means in the stack adjustable for controlling the mixture of flue gas from the engine and flue gas from the burner which passes from the stack to the compressor, a well casing closed at the top having means for applying the pressurized fuel gas thereto after it is heated by the burner, and a discharge pipe extending through the casing with its lower end near the bottom and adjustable therein for discharging liquid therefrom when heated flue gas under pressure is applied to the well casing.

References Cited in the file of this patent

UNITED STATES PATENTS

| | | |
|---|---|---|
| 781,908 | Richards | Feb. 7, 1905 |
| 956,058 | Elten | Apr. 28, 1910 |
| 968,851 | Illy | Aug. 30, 1910 |
| 1,028,338 | Ellsworth et al. | June 4, 1912 |
| 1,200,423 | Huff | Oct. 3, 1916 |
| 1,677,349 | Kallmeyer | July 17, 1928 |
| 1,716,854 | Husted | June 11, 1929 |
| 2,421,528 | Steffen | June 3, 1947 |